United States Patent Office 3,523,945
Patented Aug. 11, 1970

3,523,945
(2,4-DIMETHOXY-s-TRIAZIN-6-YL)PYRENE MONOSULPHONAMIDE
John Mon Evans, Bebington, England, assignor to Lever Brothers Company, New York, N.Y., a corporation of Maine
No Drawing. Filed Mar. 21, 1967, Ser. No. 624,728
Claims priority, application Great Britain, Mar. 24, 1966, 13,168/66
Int. Cl. C07d 55/36
U.S. Cl. 260—248    1 Claim

ABSTRACT OF THE DISCLOSURE (2,4-dimethoxy-s-triazin-6-yl) pyrene monosulphonamide, prepared by reacting (2,4-dimethoxy-s-triazin-6-yl) pyrene with chlorosulphonic acid and followed by neutralisation with ammonia, is useful as a fluorescer for nylon and other synthetic materials.

---

This invention relates to a new fluorescent material which is particularly suitable for the treatment of synthetic polymers such as nylon.

The new fluorescent material is the sulphonamide derivative of (2,4-dimethoxy-s-triazin-6-yl) pyrene obtained by reaction of this compound with chlorosulphonic acid followed by neutralisation with ammonia. The material is the mono sulphonamide derivative (i.e. one sulphonamide group per molecule) with substitution occurring in the pyrene ring.

The invention provides a compound of the general Formula A

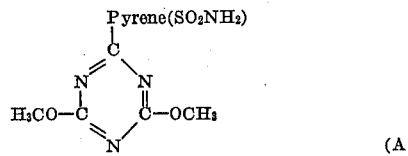

(A)

(2,4-dimethoxy-s-triazin-6-yl) pyrene is described and claimed in British Pat. 985,484 (ICI) and is available commercially as Fluolite XMF (Fluolite is a registered trademark).

The sulphonamide derivative of the invention has the advantage over Fluolite XMF that it has an equivalent brightening performance on a weight for weight basis but its solubility makes it better suited for application from aqueous systems. For this reason the sulphonamide derivative is better suited than Fluolite XMF for incorporation in detergent compositions such as heavy duty and light duty washing powders.

A further aspect of the invention is the brightening of synthetic polymers such as nylon by the application of the suphonamide derivative.

Another aspect of the invention is a detergent composition containing from 0.01 to 1.0% by weight of the composition of the sulphonamide derivative. When applied to nylon from a detergent solution the sulphonamide derivative builds up to a higher level than does Fluolite XMF and at a higher level imparts a more intense green/yellow colour.

The preparation and properties of the sulphonamide derivative are described in the following example:

Example

Fluolite XMF (5 g.) was added slowly with stirring to cool (0° C.) chlorosulphonic acid (70 g.). The reaction mixture was left to stand for 1 hour at room temperature and then poured onto ice. The precipitated solid was filtered off, washed with a little cold water and then added to ammonia solution (25 ml.; s.g. 0.88) and heated on the steam bath for 30 minutes. The solution was poured into water (100 ml.), filtered and the residue washed with water. It was finally dried in vacuum. M.P. 259°.

The sulphonamide derivative had the following ultra-violet absorption characteristics

| $\lambda_{max}(m\mu)$ | $\epsilon M(\times 10^{-3})$ |
|---|---|
| 366–368 | 28.8 |

Thin layer chromatography showed the sulphonamide derivative to be substantially pure.

What is claimed is:
1. (2,4-dimethoxy-s-triazin-6-yl) pyrene monosulphonamide.

References Cited

UNITED STATES PATENTS 2,325,803  8/1943  Schmidt et al. _____ 260—248
2,910,488  10/1959  Novello _____ 260—239.6 XR HENRY R. JILES, Primary Examiner
J. M. FORD, Assistant Examiner U.S. Cl. X.R.
252—301.2